(12) United States Patent
McCoy et al.

(10) Patent No.: US 6,733,029 B2
(45) Date of Patent: May 11, 2004

(54) HITCH BAR TIGHTENER

(75) Inventors: Richard W. McCoy, Granger, IN (US); Katherine A. Adams, Mishawaka, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 99 days.

(21) Appl. No.: 09/981,515

(22) Filed: Oct. 16, 2001

(65) Prior Publication Data

US 2002/0047249 A1 Apr. 25, 2002

Related U.S. Application Data

(60) Provisional application No. 60/242,594, filed on Oct. 23, 2000.

(51) Int. Cl.⁷ ............................................. B60D 1/24
(52) U.S. Cl. ................... 280/506; 403/109.5; 403/379.6
(58) Field of Search .............................. 280/506, 507; 403/109.5, 110, 379.6; 224/519, 521; 52/301; 292/19

(56) References Cited

U.S. PATENT DOCUMENTS

| | | | |
|---|---|---|---|
| 3,394,639 A | * | 7/1968 | Viehmann ................... 404/47 |
| 3,585,770 A | * | 6/1971 | Maizler ....................... 52/217 |
| 5,201,157 A | * | 4/1993 | Thornton et al. ............. 52/301 |
| 5,615,904 A | | 4/1997 | Van Dusen et al. |
| 5,735,539 A | | 4/1998 | Kravitz |
| 6,010,143 A | | 1/2000 | Stein |
| 6,010,144 A | | 1/2000 | Breslin |
| 6,105,989 A | | 8/2000 | Linger |
| 6,186,531 B1 | * | 2/2001 | Parent ......................... 280/506 |
| 6,334,561 B1 | * | 1/2002 | Cole ........................... 224/521 |
| 6,406,051 B1 | * | 6/2002 | Phillips ....................... 280/506 |
| 6,409,203 B1 | * | 6/2002 | Williams ..................... 280/506 |

* cited by examiner

*Primary Examiner*—Kevin Hurley
(74) *Attorney, Agent, or Firm*—King & Schickli, PLLC

(57) ABSTRACT

An apparatus is provided for tightening a draw bar, hitch bar or accessory mounting post in a receiver box of a trailer hitch receiver assembly. The apparatus broadly includes a body having an intermediate section with a threaded aperture and a pair of projecting mounting lugs. The apparatus also includes a threaded mounting bolt for engaging the threaded aperture in the body. The body is essentially W-shaped including a pair of shoulders on the intermediate section and a beaded tip at the end of each projecting mounting lug which securely seat and hold the tightening apparatus in the lumen of a tubular hitch bar. The threaded connecting pin is tightened in the threaded aperture in the intermediate section of the body when the hitch bar is positioned in the receiver box in order to tighten the hitch bar against the wall of the receiver box and prevent rattling.

22 Claims, 2 Drawing Sheets

HITCH BAR TIGHTENER

This application claims the benefit of U.S. Provisional Patent Application Ser. No. 60/242,594 filed Oct. 23, 2000.

TECHNICAL FIELD

The present invention relates generally to the trailer towing field, and, more particularly, to an apparatus for tightening a hitch bar or an accessory mounting post in a receiver box of a receiver assembly.

BACKGROUND OF THE INVENTION

It has long been known to construct towing hitches that are mounted to vehicles in order to allow the towing of trailers or the like. In recent years such hitches have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 35365 as manufactured by Reese Products, Inc. of Elkhart, Ind. Such a hitch receiver is also disclosed in, for example, U.S. Pat. No. 3,768,837 to Reese, owned by Reese Products, Inc.

Recent efforts to enhance the versatility of a hitch receiver have led to the development of various accessories (e.g., both open and enclosed article carriers, bike racks, ski racks, tables, winches) mounted by means of an accessory mounting post in the receiver box of a trailer hitch assembly. Because of their convenience and suitability to the particular applications/interests of the user such accessories have become very popular.

In order to allow ease of connection between a hitch bar, draw bar or accessory mounting post and the receiver box, dimensional clearance is provided so as to allow for free sliding of the hitch bar, draw bar and accessory mounting post into and out of the receiver box. Once in proper position a connecting pin is inserted through aligned apertures provided in the opposing walls of the receiver box and a cooperating aperture running through the hitch bar, draw bar or accessory mounting post. A pin clip, of a type known in the art is then secured in a groove on the connecting pin to securely retain the connecting pin in place and complete the connection.

As a result of the provision of the necessary clearance to allow this free sliding movement and variations in different manufacturers' tolerances, sufficient play may exist between a particular draw bar, hitch bar or mounting post and the receiver box walls to allow for vibration potentially resulting in the production of an audible rattling sound which may become annoying to the vehicle operator. A need is therefore identified for a means of dampening the vibration and suppressing or totally eliminating any resulting rattling sound.

Several efforts have been made in the past to address this issue. U.S. Pat. No. 6,010,144 to Breslin discloses a device to prevent movement and resulting rattling between the hitch bar and the receiver box of the hitch receiver. Specifically, a connecting pin secures the hitch bar in the receiver box while a lock screw is tightened against the side of the hitch bar to prevent rattling. In a retrofit embodiment of this invention for existing trailer hitch receivers, a collar is secured to the receiver box by screws. This collar receives a tightening screw which is tightened against the side of the hitch bar to prevent the hitch bar from rattling in the receiver box.

In U.S. Pat. No. 5,615,904 to Van Dusen, et al. a device is disclosed comprising a tightener that is inserted in aligned bolt holes to secure the draw bar in the receiver box. The tightener includes a threaded tail, a midsection, a shoulder and a head. A washer and cooperating nut are tightened onto the tail of the tightener. The diameter of the shoulder is smaller than the diameter of the bolt hole in the receiver box. However, the diameters of the shoulder and the head are larger than the diameter of the bolt hole in the draw bar. Thus, the tightener may be tightened down to squeeze the draw bar against one wall of the receiver box while also preventing the draw bar from being removed from the receiver box.

While useful for their intended purposes the devices disclosed in the Breslin and Van Dusen et al. patents noted above suffer from a number of shortcomings. The retrofit device of the Breslin patent is mounted externally to the hitch receiver where many would consider it aesthetically unattractive. It also cannot be effectively mounted to hitch receivers including a reinforced lip or opening as such a structure would interfere with the receipt of the collar over the hitch receiver. Additionally, the device may be easily stolen.

In contrast, the Van Dusen et al. device requires a hitch receiver with opposed apertures of differing size: i.e., one aperture must be larger to receive the shoulder of the tightener which extends through the sidewall of the receiver box to directly engage the draw bar, hitch bar or accessory mounting post. As such it is not readily retrofitable to existing trailer hitch receivers. This is particularly true since the drilling of a larger aperture on one side of the receiver box is a permanent alteration which many owners are unwilling to make.

In yet another approach, a metal block carried in a substantially C-shaped rubber or plastic sleeve is inserted into the lumen of a hitch bar. The block includes a threaded aperture that is aligned with the pin receiving apertures of the hitch bar used to secure the hitch bar in the receiver box. A bolt is then tightened in the aperture to complete the connection and draw the block and, thus, the hitch bar tight against the side wall of the receiver box.

While such a device is useful for its intended purpose, it is inconvenient to use and thus of limited consumer appeal. Specifically, the device is only loosely held in place in the lumen of the hitch bar and as such easily shifts relative to the hitch bar. This causes misalignment between the threaded aperture in the device and the pin receiving apertures in the hitch bar. Accordingly, the device must be realigned with each use. This is both difficult and time consuming. As such, it is often frustrating to use the device leading many operators to abandon its use. A need is therefore identified for an improved apparatus or device for tightening a hitch bar, draw bar or accessory mounting post in a receiver box of a receiver assembly.

SUMMARY OF THE INVENTION

In accordance with the purposes of the present invention as described herein, an improved apparatus is provided for tightening a draw bar, hitch bar or accessory mounting post in a receiver box of a receiver assembly. The apparatus includes a body having an intermediate section, incorporating a threaded aperture, and a pair of projecting mounting lugs. The apparatus also includes a threaded mounting bolt for engaging the threaded aperture in the body.

In accordance with additional aspects of the present invention the body is substantially W-shaped. Each of the projecting mounting lugs forms an included angle with the intermediate section of between 0–35 degrees and, more typically, 10–30 degrees. Further, each of the projecting mounting lugs includes a beaded tip designed to securely engage the inside of a hitch bar, draw bar or accessory mounting post so as to securely hold the apparatus therein. This prevents the tightening apparatus from shifting relative to the hitch bar, draw bar or accessory mounting post in which it is secured. Accordingly, the threaded aperture in the intermediate section is always properly aligned with the pin receiving apertures in the hitch bar, draw bar or accessory mounting post that allow connection of the bar or post in the receiver box of a receiver assembly.

The W-shaped intermediate section includes a channel opening in a direction away from the projecting mounting lugs. The sidewalls of the channel and the proximal ends of the mounting lugs come together to form two spaced mounting shoulders. These mounting shoulders engage with the wall of the draw bar, hitch bar or accessory mounting post into which the apparatus is positioned. Since the frictional holding force is concentrated at the shoulders a secure connection is achieved.

In the present preferred embodiment of the invention the body of the apparatus is made from aluminum and the mounting lugs are bendable to allow insertion in the lumen of most draw bars, hitch bars or accessory mounting posts into which it is desired to secure the apparatus.

In accordance with yet another aspect of the present invention the threaded mounting bolt includes a head at a first end and a groove adjacent a second end. A pin clip is provided for receipt in the groove where the pin clip functions to secure the threaded mounting bolt in position in cooperating aligned apertures in the opposing sidewalls of the receiver box, opposing sidewalls of the draw bar, hitch bar or accessory mounting post and the threaded aperture of the tightening apparatus.

In use, a draw bar, hitch bar or accessory mounting post with the tightening apparatus properly positioned therein is inserted in the receiver box. The cooperating apertures in the sidewalls of the receiver box and the draw bar, hitch bar or accessory mounting post are aligned. The threaded mounting bolt is then inserted in the apertures. When the threads on the mounting bolt engage the threaded aperture in the tightening apparatus, the mounting bolt is turned clockwise and tightened. As the mounting bolt is tightened the tightening apparatus and the draw bar, hitch bar or accessory mounting post in which it is received are drawn up tight against the inner sidewall of the receiver box thereby essentially eliminating any potential for rattling of the draw bar, hitch bar or accessory mounting post in the receiver box. Once properly tightened, the pin clip is secured in the groove on the opposite end of the mounting bolt so as to complete a secure and positive connection between the draw bar, hitch bar or accessory mounting post and the receiver box.

Still other objects of the present invention will become readily apparent to those skilled in this art from the following description wherein there is shown and described a preferred embodiment of this invention simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serves to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
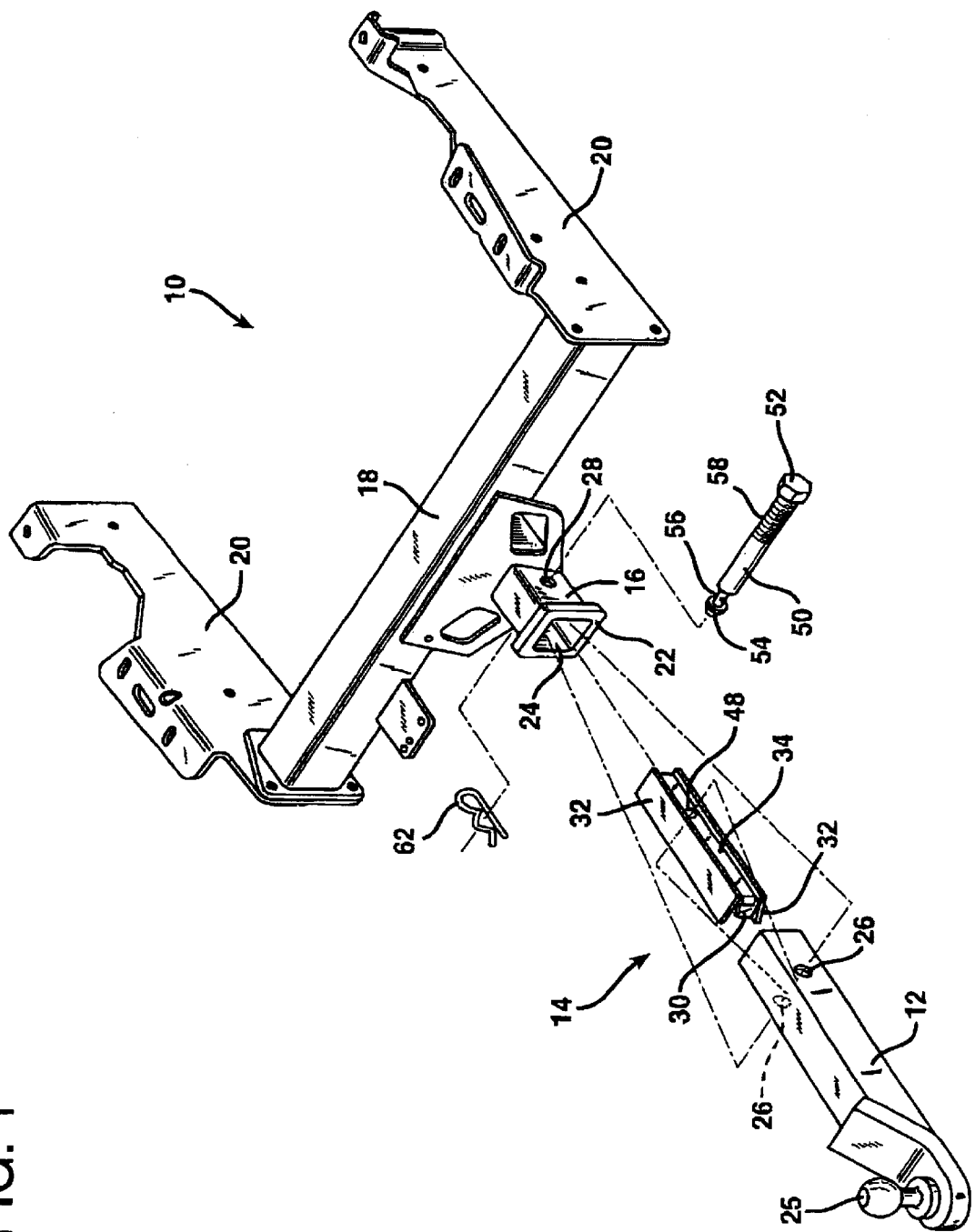
FIG. 1 is an exploded perspective view of a receiver assembly, hitch bar and tightening apparatus of the present invention.

Reference is now made to FIG. 1 showing a receiver assembly 10, a hitch bar 12 and the apparatus 14 of the present invention for tightening a draw bar, hitch bar or accessory mounting post in the receiver box 16 of the receiver assembly. The receiver assembly 10 includes a cross member 18 and a pair of mounting brackets 20 constructed from steel or other high strength material. The mounting brackets 20 are secured to the ends of the cross member 18 by welding, bolting or other suitable means and are utilized to secure the assembly 10 to the frame of a towing vehicle in a manner well known to those skilled in the art.

The receiver box 16 is carried by the cross member 18. Specifically, the receiver box 16 is welded to the cross member 18. The receiver box 16 includes a reinforced lip 22 which defines an opening leading into a cavity 24 for receiving and holding a hitch bar 12. That hitch bar 12 may carry a hitch ball 25 directly or through a ball mount head (not shown) so as to allow connection to and the towing of a trailer.

As noted earlier, the cavity 24 of the receiver box 16 is sized and shaped to provide the necessary clearance to allow the hitch bar 12 to be freely received in the receiver box. Specifically, when the hitch bar 12 is properly seated in the receiver box 16, apertures 26 in opposing sidewalls of the hitch bar are aligned with apertures 28 in opposing sidewalls of the receiver box 16. A connecting pin is then inserted in the apertures 26, 28 and a pin clip is inserted over the end of the connecting pin to secure the assembly together. Unfortunately, the clearance necessary to allow for free sliding attachment and receipt of the hitch bar 12 in the receiver box 16, under certain operating conditions, may allow vibration of the hitch bar resulting in the generation of a rattling noise which may become annoying to the operator of the towing vehicle. The present invention addresses this problem by minimizing or completely eliminating the rattling noise.

Figure 2:
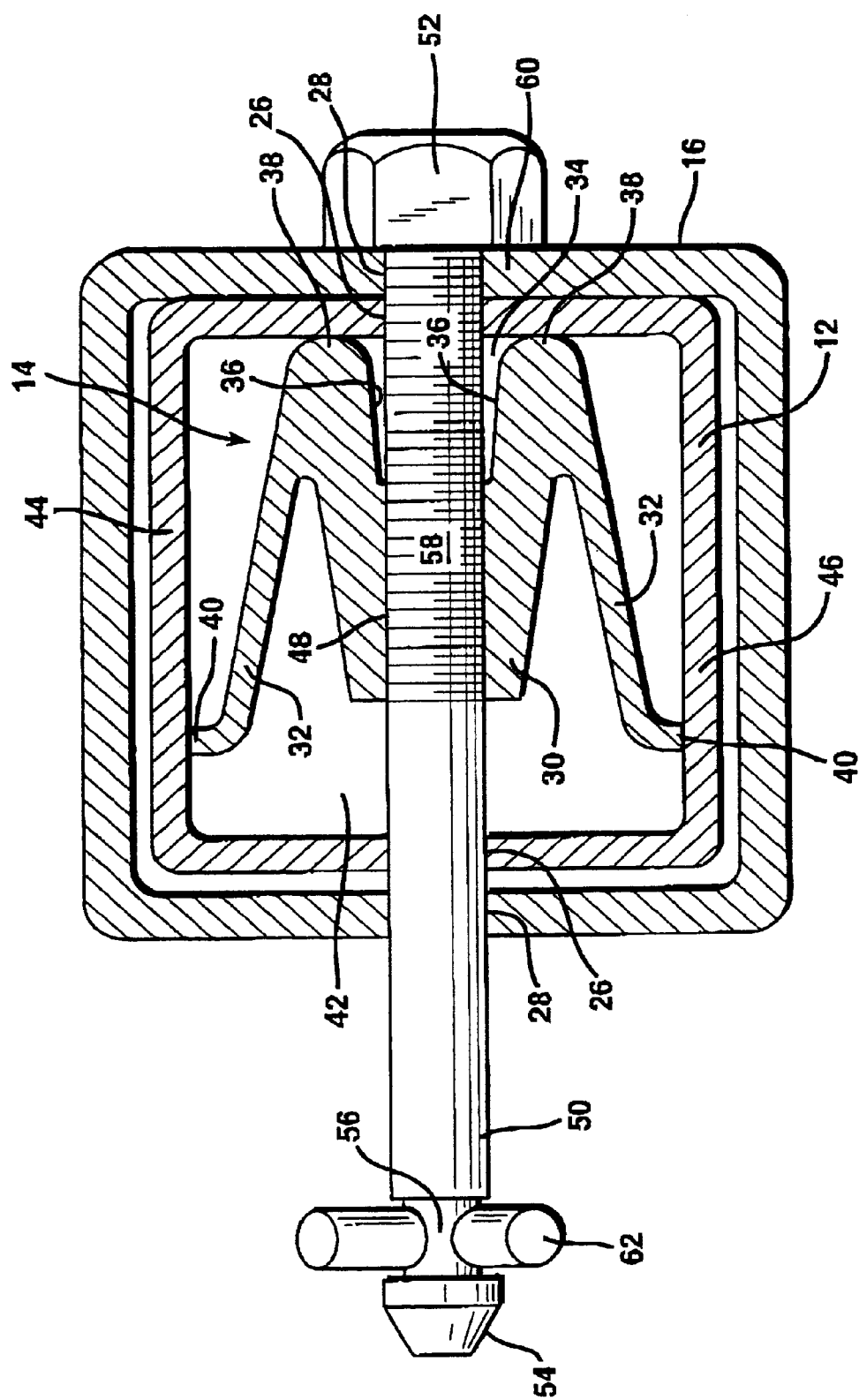
FIG. 2 is a detailed cross-sectional view showing the securing of the hitch bar in the receiver box utilizing the tightening apparatus of the present invention.

As best shown in FIG. 2 the tightening apparatus 14 in one embodiment of the present invention has a vaitary body, formed as a single piece, including an intermediate section 30 and a pair of projecting mounting lugs 32. Each projecting mounting lug 32 forms an included angle with the intermediate section 30 of between 0–35 degrees and more typically 10–30 degrees. A channel 34 is provided in the intermediate section 30. The channel 34 opens in a direction away from the projecting mounting lugs 32 and together with the mounting lugs provides the body with an overall, substantially W-shape. The sidewalls 36 of the channel 34 and the proximal ends of the mounting lugs 32 come together to form a pair of spaced shoulders 38. It should further be appreciated that each of the projecting mounting lugs 32 includes a beaded tip 40 at a distal end thereof. As will be described in greater detail below, the shoulders 38 and the beaded tips 40 function together to provide secure and stable mounting of the tightening apparatus 14 within the hitch bar 12.

More specifically, it should be appreciated by reference to FIG. 2 that the hitch bar 12 is formed from square tubular steel material and, as such, includes a lumen 42. The tightening apparatus 14 is adapted to be mounted within the lumen 42 of the hitch bar 12. More specifically, the tightening apparatus 14 is formed from aluminum which is a fairly soft material that allows the projecting mounting lugs 32 to be positioned to form an included angle of between 0–35 degrees with the intermediate section 30 of the apparatus so as to provide a span between the beaded tips 40 of the mounting lugs necessary to snugly engage the upper and lower walls 44, 46 of the hitch bar 12. More particularly, the apparatus 14 may be positioned in the lumen 42 of the hitch bar 12 by driving in place with a hammer or any other appropriate means until the threaded aperture 48 in the intermediate section 30 is directly aligned with the apertures 26 in the sidewalls of the hitch bar 12. As the apparatus 14 is driven into place in the lumen 42, the beaded tips 40 are flattened against the upper and lower walls 44, 46 of the hitch bar 12. The inherent resiliency of the aluminum material ensures good contact and a secure friction fit is provided by the concentration of forces along the line of the beaded tips 40.

With the tightening apparatus 14 seated in the lumen 42 of the hitch bar 12 as described, the hitch bar may now be inserted into the receiver box 16 of the trailer hitch receiver assembly 10. Specifically, the proximal end of the hitch bar 12 is aligned with and inserted into the cavity 24 defined by the receiver box 16 until the apertures 26 in the hitch bar are aligned with the apertures 28 in the sidewalls of the receiver box. The threaded mounting bolt 50 is then inserted into the aligned apertures 26, 28 and the threaded aperture 48. More particularly, the threaded mounting bolt 50 includes an enlarged head 52 at a first end preferably in the form of a hexagonal bolt head. The second end of the mounting bolt 50 includes a frustoconical tip 54 to aid in locating the bolt in the aperture 28, and an adjacent groove 56.

When the threaded mounting bolt 50 is properly aligned and located in the aperture 28 in the first sidewall of the receiver box 16, it may then be pushed through the aperture 26 in the first sidewall of the hitch bar 12, the threaded aperture 48 in the intermediate section 30 of the tightening apparatus 14 and the apertures 26 and 28 in the opposite sidewalls of the hitch bar and receiver box 16, respectively, until the threaded portion 58 of the mounting bolt 50 engages the threaded aperture 48 of the tightening apparatus. At this point the bolt 50 is tightened by turning clockwise. A wrench may be used to engage the hexagonal head 52 of the bolt in order to complete the connection.

If the tightening apparatus 14 is not already secured in the lumen 42 of the hitch bar 12 with the shoulders 38 butting against the sidewall of the hitch bar, initial tightening of the bolt 50 causes the apparatus to become seated in the hitch bar with the shoulders 38 tightly engaging the sidewall 60. The shoulders 38 provide two engagement lines which concentrate the frictional holding force to further tightly and positively secure the tightening apparatus 14 in the lumen 42 with the threaded aperture 48 aligned with the apertures 26 in the hitch bar 12. Continued tightening of the mounting bolt 50 causes the hitch bar 12 to be drawn tightly against the sidewall 60 of the receiver box 16. In this position any potential for the hitch bar 12 rattling in the receiver box 16 is virtually eliminated. When the mounting bolt 50 is properly seated as disclosed, a pin clip 62 is then positioned over the groove 56 on the second end of the mounting bolt to complete a secure connection of the hitch bar 12 in the receiver box 16 of the hitch receiver assembly 10.

The foregoing description of the preferred and alternative embodiments of the invention has been presented for purposes of illustration and description. It is not intended to be exhaustive or to limit the invention to the precise form disclosed. Obvious modifications or variations are possible in light the above teachings. For example, the preceding description and illustration refer to the connection of a hitch bar 12 in the receiver box 16. That receiver box 16 will just as easily receive and hold a draw bar or an accessory mounting post in which the apparatus 14 of the present invention may be secured. That apparatus 14 will then function in the same manner to secure the draw bar or accessory mounting post against vibration and rattling. The embodiment was chosen and described to provide the best illustration of the principals of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for tightening a draw bar, hitch bar or accessory mounting post including a pair of aligned holes formed in opposed sidewalls thereof in a receiver box of a receiver assembly, comprising:
   a unitary body including an intermediate section having a threaded aperture adapted for aligning with the holes and a pair of projecting mounting lugs, each lug of said pair of mounting lugs adapted for engaging one of the sidewalls when the aperture is positioned in alignment with the holes; and
   a threaded mounting bolt capable of being selectively threaded into and withdrawn from said aperture in said body when aligned with the holes,
   whereby the draw bar, hitch bar, or accessory mounting post is held securely in place when the threaded bolt is threaded into the aperture and tightened down.

2. The apparatus of claim 1, wherein said body is substantially W-shaped.

3. The apparatus of claim 1, wherein each of said projecting mounting lugs includes a beaded tip.

4. The apparatus of claim 1, wherein said threaded mounting bolt includes a head at a first end and a groove adjacent a second end.

5. The apparatus of claim 4, further including a pin clip received in said groove.

6. The apparatus of claim 1, wherein each of said projecting mounting lugs forms an included angle with said intermediate section of between 0–35 degrees.

7. The apparatus of claim 1, wherein each of said projecting mounting lugs forms an included angle with said intermediate section of between 10–30 degrees.

8. The apparatus of claim 1, wherein said body is made from aluminum.

9. The apparatus of claim 1, wherein said intermediate section includes a channel opening in a direction away from said projecting mounting lugs whereby the sides of said channel and proximal ends of said projecting mounting lugs form a pair of spaced shoulders for engaging the draw bar, hitch bar or accessory mounting post.

10. An apparatus for intended use in tightening a draw bar, hitch bar or accessory mounting post having sidewalls defining a lumen elongated in a first direction in a receiver box of a receiver assembly, comprising:
    a substantially W-shaped, unitary body elongated in the first direction and including an intermediate section having a threaded aperture and a pair of projecting mounting lugs adapted for frictionally engaging the sidewalls,
    whereby the elongated nature of the body results in a substantial amount of frictional engagement between each mounting lug and the corresponding sidewall.

11. The apparatus according to claim 10, wherein the mounting lugs each include an end adapted for frictionally engaging a corresponding first or second sidewall of the draw bar, hitch bar, or accessory mounting post.

12. The apparatus according to claim 11, wherein the W-shaped body includes a pair of spaced shoulders for engaging a third sidewall of the draw bar, hitch bar, or accessory mounting post.

13. The apparatus according to claim 10, further including a threaded bolt capable of being threaded into and withdrawn from the aperture.

14. In combination, a substantially W-shaped tightener and a draw bar, hitch bar, or accessory mounting post including an elongated lumen in which the tightener is received, wherein the tightener includes a threaded aperture extending transverse to a direction of elongation of the lumen and a pair of mounting lugs, each lug of said pair of mounting lugs engaging a different sidewall of the draw bar, hitch bar, or accessory mounting post.

15. An assembly for intended use with a hitch receiver assembly including a hitch receiver having a first pair of aligned holes, comprising:
    a tubular bar for positioning in the hitch receiver, the tubular bar including a second pair of aligned holes adapted for aligning with the first pair of aligned holes;
    a W-shaped tightener including a threaded aperture adapted for aligning with the second pair of aligned holes and a pair of projecting mounting lugs, each engaging an inner sidewall of the tubular bar; and
    a threaded mounting bolt inserted through the threaded aperture and the second pair of apertures for securing the tubular bar in the hitch receiver,
    whereby the tubular bar is held securely in place in hitch receiver when the mounting bolt is inserted into the threaded aperture and tightened down.

16. The assembly of claim 15, wherein the each of said mounting lugs engages an opposite sidewall of the tubular bar.

17. A hitch assembly, comprising:
    a tubular receiver including a first hole;
    a tubular bar including a second hole and positioned in the tubular receiver;
    a W-shaped tightener including a threaded aperture and a pair of projecting mounting lugs, each of said mounting lugs engaging an inner sidewall of the tubular bar; and
    a threaded mounting bolt for positioning in the threaded aperture in the tightener when aligned with the first and second holes,
    whereby the tubular bar is held securely in place when the mounting bolt is passed through the holes and threaded into the aperture of the tightener.

18. The assembly according to claim 17, wherein the tubular bar is selected from the group consisting of a hitch bar, a draw bar, and an accessory mounting post.

19. The assembly according to claim 17, wherein the tubular bar is substantially concentric with the tubular receiver.

20. The assembly according to claim 17, wherein the tightener is W-shaped and the threaded aperture is formed in an intermediate section thereof.

21. The assembly according to claim 17, wherein tubular receiver includes a pair of aligned first holes and the tubular bar includes a pair of aligned second holes, wherein the mounting bolt is passed through the pairs of first and second holes.

22. An apparatus for tightening a draw bar, hitch bar or accessory mounting post including a pair of aligned holes formed in opposed sidewalls thereof in a receiver box of a receiver assembly, comprising:

a body including an intermediate section having a threaded aperture adapted for aligning with the holes and a pair of projecting mounting lugs, each lug of said pair of mounting lugs adapted for engaging one of the sidewalls when the aperture is positioned in alignment with the holes; and a threaded mounting bolt capable of being selectively threaded into and withdrawn from said aperture in said body when aligned with the holes, wherein said intermediate section includes a channel opening in a direction away from said projecting mounting lugs, the sides of said channel and proximal ends of the projecting mounting lugs forming a pair of spaced shoulders for engaging the draw bar, hitch bar or accessory mounting post, whereby the draw bar, hitch bar, or accessory mounting post is held securely in place when the mounting bolt is inserted into the threaded aperture and tightened down.

* * * * *